United States Patent [19]

Sperberg

[11] 3,769,843

[45] *Nov. 6, 1973

[54] STATISTICAL DESIGNED EXPERIMENTS

[76] Inventor: Lawrence R. Sperberg, 6740 Fiesta Dr., El Paso, Tex. 79912

[ * ] Notice: The portion of the term of this patent subsequent to Aug. 29, 1985, has been disclaimed.

[22] Filed: May 20, 1970

[21] Appl. No.: 38,559

Related U.S. Application Data

[63] Continuation-in-part of Ser. No. 743,749, July 10, 1968.

[52] U.S. Cl. .................... 73/432 R, 73/8, 73/146
[51] Int. Cl. .................... G01m 17/02, G01n 19/00
[58] Field of Search ................ 73/7, 8, 15, 6, 146, 73/432; 152/343

[56] References Cited
UNITED STATES PATENTS

| | | | |
|---|---|---|---|
| 1,845,583 | 2/1932 | DesRosier | 152/343 |
| 1,961,726 | 6/1934 | Abbott, Jr. | 73/51 |
| 3,039,297 | 6/1962 | Peter et al. | 73/88 |
| 3,280,617 | 10/1966 | Rye | 73/15.6 |
| 3,397,583 | 8/1968 | Sperberg | 73/432 |

OTHER PUBLICATIONS

Richey et al.; An Indoor Tester for Measuring Tire Tread Wear International Rubber Conference Proceedings: Wash. D.C. Nov. 1959, pp. 104–110.

Primary Examiner—S. Clement Swisher

[57] ABSTRACT

Method of evaluating tread wearing compositions for a vehicle tire, comprising: arranging segments of a different tread wearing compounds circumferentially about a tire body to form a continuous tread wearing surface. The tire is then subjected to a wear performance test to determine the relative performance of one of the segments as compared to another segment. The resulting accumulated data is analyzed by the use of a statistical design which characterizes the wear performace of each segment at any desired level of precision and accuracy.

14 Claims, 5 Drawing Figures

INVENTOR.
LAWRENCE R. SPERBERG.
BY Marcus L Bates

STATISTICAL DESIGNED EXPERIMENTS

REFERENCE TO RELATED PATENT APPLICATIONS

My previous filed patent application, Ser. No. 743,749, filed July 10, 1968, now abandoned, of which this application is a continuation in part.

This invention relates to tire manufacture and tire testing; more particularly the invention is directed to a method that will permit the technical investigator to predict with extremely high precision the potential wear capabilities of various tire tread compositions, to determine accurately and precisely true differences in wear of tires of different manufacturers, and to increase the precision for measuring and determining the influence of individual construction changes and principles upon the fundamental property of abrasion resistance. Furthermore, it is possible to make such determinations and wear comparisons under vastly different conditions of wear severity and climatic conditions at greatly reduced expenditures of time and money that heretofore have been considered impossible or impracticable. The invention further concerns a method of process control in which the state of cure of a rubber composition may be accurately derived and accordingly corrected to give an optimum cure gradient and state.

Comprehension of the terms "cure gradient" and "state of cure" as related to wear rate is a difficult consideration without first having reviewed portions of the art to better understand applicant's invention; hence a brief summary is included herein.

Vulcanization of rubber is a very complex phenomenon. During the process of vulcanization, cross-links occur between long macro-molecules that inhibit the movement of the molecule, thereby decreasing the plasticity while retaining the resilience of the rubber composition. In sulfur vulcanization, for example, it is thought that the sulfur is combined both inter-molecularly as well as intra-molecularly. In recent years it has become very fashionable for laboratories to measure and philosophize on the cross-linkage existent in the vulcanizates, the normal interpretation being that an increase in cross-linkage is a measure of the increase in the state of cure. This is as it may be; but is not held to be of significance by applicant so far as cure gradient or state of cure is concerned for the reason that cross-linkage, as presently derivable, cannot be directly and reliably related to true state of cure.

Today's state of the art provides many laboratory tools to measure state and rate of cure, but despite the many advanced instruments, procedures, and techniques available to the trained investigator, the true influence of state of cure upon the elementary property of abrasion resistance is not understood. None of the procedures or techniques in current vogue enable the investigator to foretell what the abrasion resistance of any cure gradient or state will be, although a great deal of attention is focused on this problem. The "cureometers" are excellent instruments for measuring rate of cure, but they do not permit a measure of the state of cure. The determination of cross-link density of vulcanizates seemingly measures the "tightness" of cure but does not give a measure of the influence of this "tightness" upon the abrasion resistance.

Reinforcement of rubber vulcanizates is of extreme interest and value since it contributes markedly to the ultimate life of most rubber products and specifically to pneumatic rubber tires. While reinforcement is an omnibus term, patentee regards it as the ability of a rubber composition to resist abrasive wear when applied to a pneumatic rubber tire. Reinforcement has been studied intensively since the first observation was made many years ago that carbon black contributed markedly toward improving the property of resisting abrasive wear. In today's technology, the class of carbon blacks known as HAF (high abrasive furnace) represents the most commonly used in tread compounds. HAF has replaced channel black as the principal material to impart abrasion resistance to a tread compound. The other classes of carbon blacks that are used in tread compounds include ISAF (intermediate super abrasive furnace) and SAF (super abrasive furnace) type blacks. The difference in abrasive resistance between these carbon black types is moderate; if HAF is taken as 100 percent, channel would be 90–95 percent, ISAF, 110 to 115 percent, and SAF, 120 to 130 percent.

Reinforcement, or resistance to abrasion, is also affected by the type of rubber compounded into the tread material. "Cold rubber" brought about an improvement in abrasion resistance of 10–15 percent over hot "GRS." Polybutadiene rubber improves resistance one percent for each one percent of rubber hydrocarbon replaced by the polybutadiene rubber. Thus it is evident that the magnitude of the changes in the abrasion properties brought about by any single above giant step forward in the art is of the order of only a few percent improvement.

The improvement in abrasion resistance effected by choice and dosage of carbon black, choice and composition of the rubber types employed, etc., is relatively small as compared to the improvement that results in controlling the cure gradient in tires.

In a series of carefully controlled performance tests including both truck and passenger tires, applicant has discovered that the cure gradient existent in the tire may affect the abrasion resistance by as much as 150 percent to 200 percent, and in exceptional cases over 200 percent.

The importance of the cure gradient in affecting the property of abrasion resistance has not been recognized by the industry because of the difficulty of accurately measuring and defining the term "cure gradient" and also because of the poor resolving power of measuring differences in abrasion resistance accurately and reproducibly.

Hence, the test procedures presently acceptable to industry cannot be used as accurate quantitative tools for measuring cure gradient. Indirect measurements or estimates of cross-linkage by the use of swelling tests and the like do not give a suitable indication of potential, absolute, or even relative changes in abrasion resistance.

Laboratory test data show the curing temperature to have a marked effect upon most physical properties of rubber (tensile strength, modulus, hardness, hysteresis, etc.). The higher the cure temperature, the poorer are the properties. This is especially so with straight chain polymers that are susceptible to scission. When comparing two rubbers or carbon blacks that differ in curing rate the final wear results are affected by cure differences still existent in the formulas due to their not being perfectly adjusted to compensate for the different curing rates, for badly matched curing rates may cause an experimental carbon black or rubber to vary over a 50 percent range in abrasion resistance in comparison to a control. On the other hand, even if the curing rates are matched perfectly at one curing temperature, they may be vastly dissimilar at another curing temperature. Hence, when comparing one vulcanization system to another, the relative difference between the two systems is governed by the time and temperature of cure as well as the absolute dosage, for the type of cure employed has a marked bearing upon the uniformity of cure, or the cure gradient, as is evident in road wear tests where the miles/mil of rubber abraded away from the tread surface following a curve that is defined herein as the cure gradient.

Accordingly, it is seen that in the manufacture of a tire, the cure gradient, or curative levels, and the most desirable curative types to employ for any specific factory cure is a very complex consideration, generally based on a composite of very diverse and sometimes conflicting data. In the absence of a complete comprehensive picture of the relationship between cure state and cure gradient and abrasion resistance and abrasion resistance changes, it is easy to understand how misinterpretations of existing available data could readily occur.

The novel approach to process control in tire manufacture contained herein is based on recognition of the existence of this cure gradient and relative state in the tread of a tire. The cure gradient and state and their individual and combined effects on tire wear heretofore have been masked by many variables that are really imperfections in the structural considerations of the tire and in choice of the cure conditions. Many of these variables are necessary evils to be associated with the mass-production of a tire. Recognition of the cause and effect of these variables and the elimination thereof in a specifically designed testing program enables one to carry out a test with a tire that will respond to road wear testing in a predictable manner.

The object of the present invention is to set forth a novel method of controlling the vulcanization of a tire so as to attain an optimum state of cure and the most desirable cure gradient in the tread composition.

Another object of the present invention is to set forth a novel method of obtaining and treating experimental data as related to tire tread wearing compounds.

A still further object of the present invention is to outline a novel test procedure for ascertaining the potential wear capabilities of various tire tread compositions under vastly different conditions of wear severity and climatic conditions and with great exactness and a low cost.

These and still other objects and advantages not specifically mentioned above, will become apparent to those skilled in the art, from the following description of the preferred embodiments of the invention.

Figure 1:
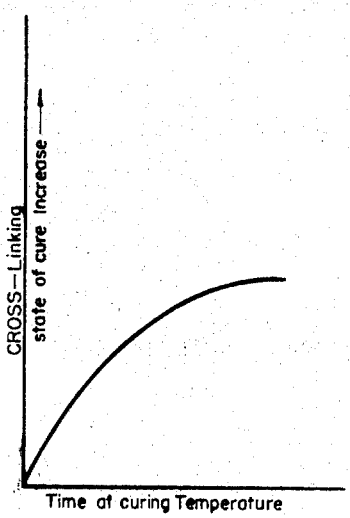
FIG. 1 shows a plot of time and temperature versus cross-linking of the rubber molecules.

Now, looking to the drawings in detail, FIG. 1 shows the present concept of the state of cure as effected by time and temperature of the vulcanization, which shows that cross-linking levels off with time of cure. The present thought is that cross-linkage determinations do reflect the ultimate state of cure conditions as they exist. When a tire exhibits better wear performance as the tread design compound is worn away, the present thought attributes such increase to the cure's being "tightened up," that is, an additional increment of vulcanization is postulated to have taken place due to the mechanical influence of wearing away of the tread.

Figure 5:
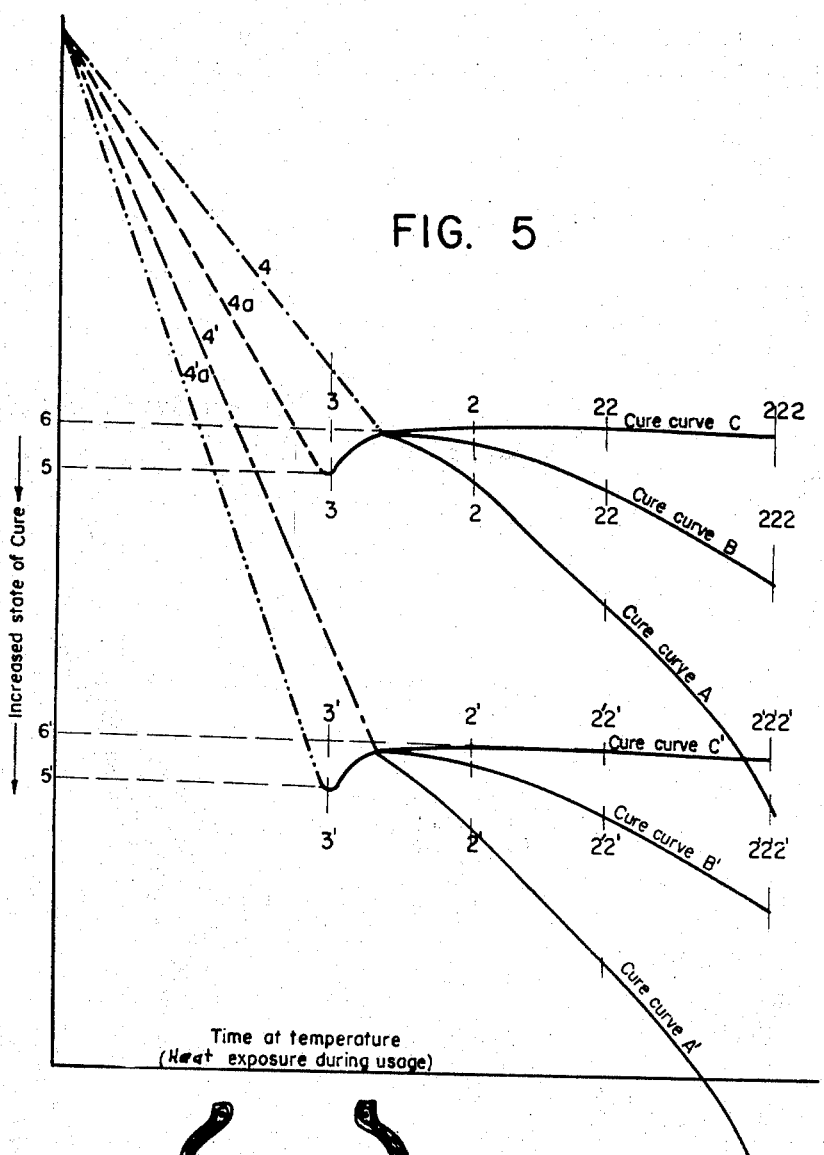
FIG. 5 is a plot showing the relationship of the state of cure on the abrasion quality of a rubber composition.

Looking now to FIG. 5 wherein there are depicted curves illustrating applicant's concept of the relationship between time of cure, fundamental state of cure, and resistance to abrasion. The maximum resistance to abrasion is achieved at the minimum state of cure that will still yield a usable tire. This is represented by a point slightly to the right of point 3 of the upper curve and point 3' of the lower curve and by the horizontal line 6 or 6'. Point 3 or 3' represents the minimum time of cure at which a usable tire may be obtained that will not fail due to insufficient vulcanization. In the lower curve, 6' represents the maximum resistance to abrasion that can be expected from a rubber composition that has a higher state of cure; that is, the absolute dosage or cure condition is different from the upper curve and the entire curve represents a system of lower quality as compared to the upper curve. Line 6' represents the maximum resistance to abrasion that can be expected from such a composition in comparison to line 6 which is an idealized situation that will yield the absolute in abrasion resistance. In examining these curves it is seen that there is a break in the curves at the optimum state of cure between numerals 2 and 3 (or 2' – 3').

Any state of cure along curve portion 4 or to the left of numeral 3 or 3' is to be considered undercured while any state of cure below line 5 or 5' along curves $abc$ or $a'b'c'$ is to be considered overcured. It is not know if the true representation of undercure actually falls along curve $4a$ or $4a'$ as shown; however, most investigators favor this concept although the applicant favors the concept as depicted by curves 4 and 4'. The novel concept of cure gradient as related to wear performance is illustrated by this curve which represents the actual state of cure that will be followed by the tread composition during the process of vulcanization and usage in contrast to the present concept illustrated in FIG. 1.

As will be further apparent from FIG. 5, there exists an optimum minimum state of cure, 5–6, for any vulcanizate. Any state of cure that falls above line 6 will be undercured, and since a tire that is undercured will not run under any circumstances but will fail prematurely in any kind of usage, it is absolutely essential that minimum acceptable state of cure be achieved. Therefore, in any tread compound, a minimum acceptable state of cure is more readily and conventionally achieved from the overcured side 2 of the curing cycle. The time-temperature combination of the cure must be selected to give this optimum state of cure as represented by that portion of the curve 2–3 of FIG. 5, and, as will be apparent from the remainder of this disclosure, the cure gradient must lie in this optimum region represented by the curve portion 2-3, if the highest quality 5-6 is to be realized. The realization of a proper cure gradient is best epitomized by cure $c$ of FIG. 5 as contrasted to curve $a$, but it should be recognized that curve $c'$ and even curve $b'$ are ultimately better than curve $a$.

Figure 4:
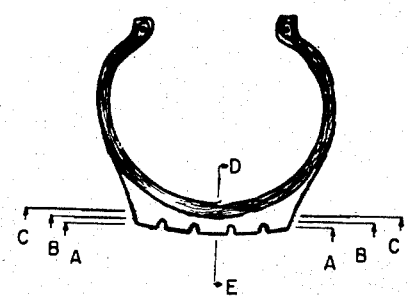
FIG. 4 is a schematic representation of a cross-section of a tire showing three different levels or sections of the tread compound.

Looking now at FIG. 4, there appears a sectional view of a tire having lines A—A, B—B, C—C, drawn horizontally therethrough to represent various sections or levels through the thickness D-E of the tread wearing portion. Tread portion A—A will be the first tread portion to wear away with tread portions B—B and C—C following.

Figure 3:
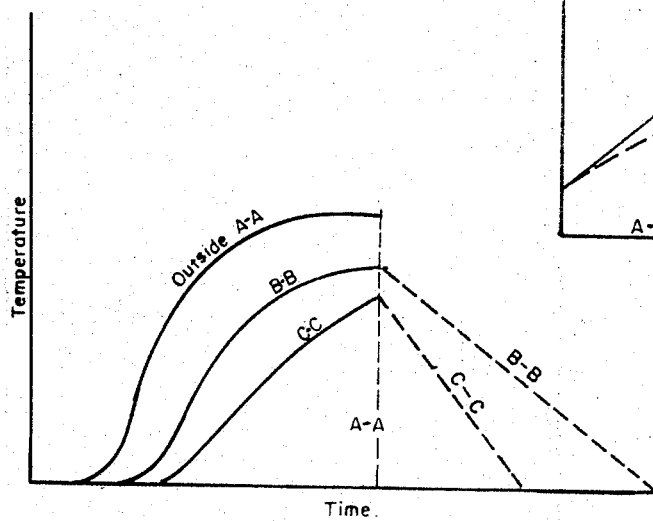
FIG. 3 shows a plot of the relative amount of heat exposure by different sections of a tire while being vulcanized.

The curve of FIG. 3 illustrates a cure rate for a tire that was vulcanized with heat being applied during the vulcanization process to both the inner and outer sides of the tire body in the tire mold. A study of the heat transfer mechanism involved in the curing of the tread composition will show that a different total amount of energy of cure is received by each increment of tread depth as compared to another increment of tread at a different depth; that is, the total energy supplied by the tire mold to a section of the tire at the surface of the tread A—A in FIG. 4 will differ from the amount of energy received by the center portion or sub-surface of the tread B—B of FIG. 4. It follows that the area under the curve A—A of FIG. 3 is indicative of the amount of cure that the tread compound at section A—A of FIG. 4 receives, while the areas under the curves B—B and C—C are indicative of the amounts of cure received by tread portions B—B and C—C respectively of FIG. 4. It should be understood that the areas under the individual curves are not directly comparable because the vulcanization rate of reaction from one compound to another is a function of the applied temperature. In general, the temperature coefficient of vulcanization is assumed to follow Arrhenius' theory to give a coefficient of 1.4 to 2 as applied to chemical reaction rate changes where the reaction doubles in rate for each 10° C. increase. In a normal cure for a pneumatic tire the point of minimum cure may vary between B—B and C—C and depends upon the amount of heat energy applied from both external and internal sources as well as the actual time of cure. In truck tires where the overall thickness is quite great, the heat transfer gradient is more pronounced, and the point of miniumum cure is more apt to occur at C—C rather than A—A or B—B, whereas in thinner passenger type tires the point may tend towards B—B. A thinner tire allows a closer approach to curves $b'$ or $c'$ of FIG. 5 than is possible with the thicker truck tires; however, it is very difficult to approach curve $c$ as the ultimate since even a slight excess of time or temperature can result in a marked influence in moving the cure curve from $c$ to $b$ or even to $b'$ or $a'$.

The dotted extensions of the three curves AA, BB and CC of FIG. 3 indicate residual cure, or that cure that takes place after the tire has been removed from the mold. The temperature at the tread surface drops precipitously when the tire is removed from the mold but the innermost portions of the tire retain the impressed heats of vulcanization for relatively long time periods after removal of the tire from the mold. This residual or after cure sometimes contributes well over 50 percent of the total cure in the undertread region of certain sizes and types of tires. Many investigators fail to consider this residual or after cure that continues after the tire is removed from the mold and base their conclusions on cure time equivalents only on the heat exposure taking place up to the time that the mold is opened; hence substantial overcures in tires occur as a result of this defect. Assuming the amount of cure received by tread portion C—C to represent the optimum cure as represented by numeral 3 of FIG. 5 curve $a$, it follows that tread portions A—A and B—B each received some amount of overcure such as represented by numerals 2 and 2' of FIG. 5. This cure gradient, or progressive change in the state of cure through the tread depth, is brought about by the inherent heat transfer mechanism of the tire vulcanization process. A tire, as seen in FIG. 4, having such a cure gradient between AA and CC as described would exhibit excellent wear performance at tread depth C—C with less perfect wear performance at A—A. The wear performance of such a tire in actual road tests would follow a curve as represented by curve $a'$ (or $a$) in FIG. 2.

In a tire having a zero cure gradient between the tread surface A—A and the groove bottoms CC of FIG. 4, the cure curves $c$ or $c'$ in FIG. 5 would be obtained and the determining factor of whether a resistance to abrasion comparable to level 5'-6' or 5-6 was achieved would be regulated by how closely the ideal minimum but satisfactory fundamental state of cure was approached. The wear performance of such a tire tread compound in actual road tests would follow the curve type $c$ of FIG. 2. Hence, the achievement of a more desirable type of cure curve, i.e., going from type $a$ to type $b$ thence to type $c$ of FIG. 2 or 5, or the absolute position of the ideal cure range 5-6 of FIG. 5 as contrasted to a poorer range of cure 5'-6' of FIG. 5 is best found by working backwards on the curve from 222 to 3.

Figure 2:
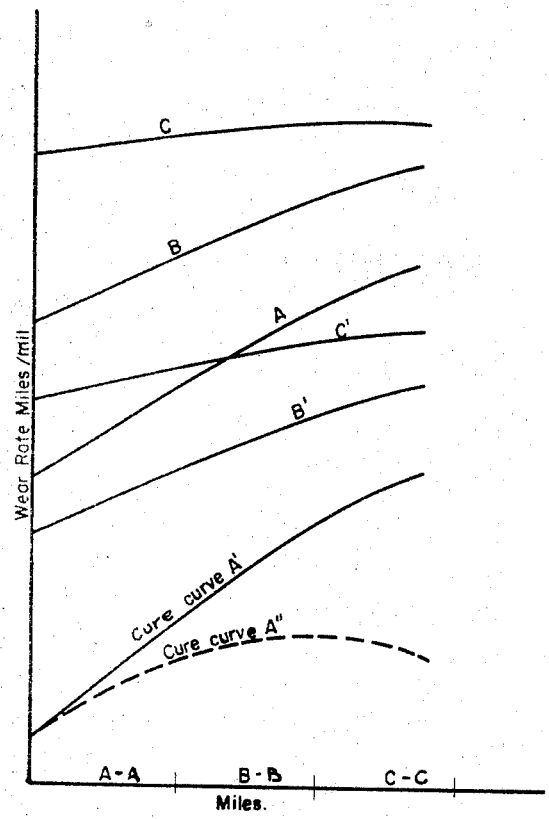
FIG. 2 shows a plot of wear rate versus miles driven for several different types of cure gradient and state.

Curve A" of FIG. 2 represents an overcured tread composition where the minimum cure state corresponds to part B—B of FIG. 4 and physically lies someplace between the tread surface and the groove bottoms. The initial increase in wear performance represents the beneficial effect of cure gradient followed by the deleterious effect of overcure as the wear performance test progressed.

In another example, let us assume the rubber composition represented by curves $c'$ and $a$ of FIGS. 2 and 5 to represent two samples of rubber having poorly matched absolute dosages (accelerators or the like) wherein the test involves a comparison of carbon blacks. While results might indicate that the carbon black used in curve $a$ is inferior to that of curve $c'$, such a conclusion is in error for the predominate difference actually being measured is the cure gradient of the compound of curve $a$ as compared to the compound represented by curve $c'$.

The influence of test severity upon relative wear performance of different tire tread stocks or tires has been the matter of much investigation and confusion during the past two decades. Actually wear test severity per se has no influence upon relative wear performance. The cure gradients and relative cure states existent in the tire treads being compared are the predominant factors that tend to give differing relative performance. Such differing performances, however, would be duplicated whether tested for low milage under high severity or long milages under low severity. Should the example cited in the previous paragraph be subjected to a normal roadwear test run on a slow wear course and terminated at 15,000 miles (for economic reasons), at this mileage possibly only that portion of the tread identified as AA of FIG. 4 and 2 might be worn away, but in another test run under more strigent conditions of load, speed, or route for the same 15,000 miles, the wear might have progressed through to point CC depicted in FIG. 4 and a complete reversal of relative wear between the two compounds would be incurred as a result of difference in the cure rate and state as exemplified by curves $a$ and $c'$ of FIG. 2. The recognition of this fundamental fact is one of the major teachings of this disclosure.

Another important factor that has a marked influence on the absolute wear rate of a tire as well as its durable life is the degree of imperfectness that characterizes the tire. A tire that is perfectly balanced, all of the stresses perfectly distributed around and throughout the tire, the interior and exterior radial runout perfect, and whose lateral and radial force variations are zero or close thereto will give the ultimate in wear performance and tire life. The dynamic flexibilities of such a tire would be considered perfect. The introduction of any of the above elements that impart various degrees of imperfectness to the tire result in a faster rate of wear, or worse yet, an uneven rate of wear around the tire where the rate of wear at any specific point on the tire surface is regulated by the dynamic flexibility existent at that particular point. In addition, the introudction of any of these elements have an immediate and drastic effect upon tire durability. Hence, an imperfect tire will mask or obscure the true amount of wear represented by the road test data as well as obscuring the true durability associated with a specific tire treatment and cause the experimenter to draw incorrect conclusions as to the wear and durability properties of a tire or the changes wrought by effecting a change in the structure or constructions of a tire. Machines are known to those skilled in the art that measure or ascertain the degree of imperfectness or non-uniformity existent in any given tire.

The measured imperfections in a tire relate to imbalance, external radial runout, internal radial runout, loaded radial runout, radial force variation and lateral force variation. Radial runout is simply the variation of a tire from a perfect planar circle, both interior and exterior, when said tire is mounted on a dimensionally perfect wheel. Radial and lateral force variation represent measured force variations in the two identified planes as a tire rotates through its 360° cycle. Ordinarily produced tires have varying degrees of imperfectness as exemplified by the items identified above. A minimum level of acceptability of minor degrees of imperfectness may specify 25 pounds radial and 7 pounds lateral force variation under certain specidied conditions of inflation, applied load, speed, tire size, etc. The varying levels of arbitrary acceptability may be determined from a performance graph derived from a sufficient sample size to characterize such graph accurately wherein the magnitude of a specific imperfection is plotted against cummulative percent of total sample. In the specified example referred to, the limits fall approximately at the 68 percent point of each individual curve of percent of total versus radial force variation and percent of total versus lateral force variation, which point represents a plus or minus one standard deviation of variation of the specific imperfection. Thus in the example cited, roughly one-third of commercially produced tires fall outside this specification and would be excluded from the test sample. The point of exclusion whether by absolute value or by percent of total sample is determined by empirical means. With reference to the specification of 25 and 7 pounds respectively it is not uncommon to encounter individual tires which may exceed these values by two-to-five fold. Such structurally deficient tires have a very marked influence upon absolute rate of wear and upon tire durability, and their inclusion in any test simply tends to obscure or cloud the true differences that may be the object of the study. Applicant has determined that tires of the minimum specifications identified above wear 20 percent faster than identically constructed structurally perfect tires and that it is not uncommon to encounter tires that wear at a 50 percent faster rate than their structurally perfect counterparts. Applicant has further noted that wear variation within the 360° circumference of a tire increases with the degree of structural imperfectness. The standard deviation of wear variation of any 45° segment with any other 45° segment in a tire having the minimum acceptable specifications of 25 pounds radial and 7 pounds lateral force variation is less than 3 percent and that the standard deviation varies one percent for each 10 pounds radial force variation. As stated previously tires having varying degrees of imperfectness generally have a tire life related to the degree of imperfectness, and in this respect the general analogy may be drawn that tire durability and rate of wear compared to a structurally perfect tire are both adversely affected in direct proportion to the magnitude of the imperfection. Since a wear performance test aimed at determining the cure gradient and state would be adversely affected by tire failures it is obvious that tires having major variations from being structurally perfect should be excluded from the test by virtue of their potentially poor anticipated tire life as well as for their adverse undesirable effect upon tire wear. In the ensuing discussion a screened tire is identified as one that is carefully selected with these elements held to a minimum so as to approach a perfect tire from structural consideration. The degree of screening employed will depend upon the precision required and the cost incurred. A screened tire that is road tested on a vehicle in perfect mechanical condition and treated in such a manner so as to eliminate or minimize the common factors affecting absolute rate of wear results in a normal distribution curve of wear variation that is very narrow and peaked in comparison to a broader shallower curve when such screening selection is not employed. This permits decisions to be made at high confidence levels even when small differences in abrasion resistance are being considered.

Whole tire road testing includes using a single type or brand of tire tread wearing compound as the entire tread composition. Multi-tread section road testing tires are those tires that are comprised of more than a single tread wearing compound as the tread composition. For example, a two way tire would be comprised of one tread wearing composition for 180° and a second tread wearing composition the remaining 180° about the tread surface of the tire. Applicant has developed a technique in which test tires may be fabricated using as many as ten different brands of rubber vulcanized in segments or sections in the tire mold to produce a tread wearing compound each 36° of the tread surface, which 36° each represents a different stock or brand of rubber. There is an obvious limit to the number of different treads that can be placed on one passenger tire without running into difficulties. This practical limit is eight compounds although in certain types of problems nine or even 10 compounds can be employed. This practical limitation is the bridging effect. In an ordinary 7.50-14 tire which has a circumference of roughly 86 inches, the contact length of the tread print is approximately 8 inches. Thus an extremely fast wearing compound sandwiched between two slow wearing compounds could conceivably be affected if the tread segment was so short as to permit both slow wearing boundary compounds to be in contact with the road at the same time that the fast wearing compound in the center was in contact with the road. It has been determined from actual tire wear tests that the stepdown or step-up in wear between extremely fast and extremely slow wearing treads is very rapid, generally occuring within 1 inch of the boundary. Thus a fast wearing section would fit nicely into a 10½ inch or 11 inch length without bridging—hence, the ultimate limitation of eight compounds per passenger tire. Since bridging becomes important only when major differences in wear characteristics are involved (three-one spread) and since most wear experiments do not have such wide variations, it is more desirable to use nine or ten sections per tire since lower standard deviations of wear variation are possible using appropriate statistical designs.

The purpose of multi-tread section tires for measurement of the wear properties is to obtain reproducible accuracy and precision of wear measurment at greatly lowered costs. Improved precision and accuracy flow from the elimination or minimization of the individual factors affecting the absolute rate of wear of whole tires—e.g., axle end, driver severity, power supply, speed, load, inflation, rim size, texture of abrading surface, ambient air and road surface temperature, cross wind effect, and wet miles, to mention some of the more important factors that regulate and influence the absolute rate of tire wear not already regulated by the imperfectness of the tire itself.

Any wear that is not a reflection of the true wear potential of the tire or tread compound being investigated is termed "mal" wear or bad wear. A screened tire, whether whole or multi-tread, that is tested under properly and rigidly controlled conditions so as to hold variables to an absolute minimum will give reliable and reproducible results as to wear performance or whole or multi-tread compositions provided the wear results are properly interpreted in accordance with a recognition of the cure gradient and state that exist in the tread compound(s) and the degree of screening employed.

For example, the standard deviation of a whole tire wear test wherein one variable or treatment is compared to another, is governed by the principal relationship of the standard deviation divided by the square root of $n$. The standard deviation is the standard deviation of wear variation existent for single tires while $n$ is the number of tires involved in each test. The standard deviation of wear variation of a single tire wear test run for 10,000 miles on a slow wear route wherein no screening selection is employed is of the order of eight percent. It is unusual to test more than four tires of a treatment in any single controlled wear test for cost reasons; hence, the standard deviation of wear variation of four tires of treatment A versus four tires of treatment B would be eight divided by the square root of four or four percent. With statistically designed wear tests where screening tires are employed standard deviations of variation of one percent can be readily obtained with as many as eight tread treatments built into only four tires. In order to achieve a comparable degree of precision with randomly selected whole tire testing, it would be necessary to test a total of 64 tires of each treatment. While such a test is technically possible, it is not so economical. Hence, the investigator must compromise and accept results at a low level of confidence and then attach an unwarranted high degree of confidence in interpreting the data. Furthermore, should the investigator feel that severity of test conditions influences final ultimate performance level (which has previously been shown an erroneous notion) a difficult and complicated testing program arises in that every variable that is to be tested for wear must now be run at different wear severities. If screened whole tires of each treatment are tested whereby the screening is such as to eliminate only those tires having radial and lateral force variations greater than 25 and 7 pounds respectively, the standard deviation of wear variation of such a selected sample would still be about 5 percent for single tire comparisons. Hence, a sample size of 25 tires per treatment would be required to achieve the desired precision and accuracy which represents a very substantial improvement over 64 tires of a non-screened variety but is still a tremendous distance from the effective one half tire required in a properly conducted statistically designed wear test where multi-treat construction is employed.

As taught in the foregoing portion of this specification, a selected screened new whole tread tire, a screened multitread tire built and cured in entirety in a normal factory operation, or a selected screened tire that has been detreaded, supplied with a new multi-tread vulcanized thereon under closely controlled curing conditions, and screened to ascertain its dynamic flexibility, will respond to road wear tests in a manner to give reliable wear data of a highly reproducible order. The road test wear data may in turn be used to obtain a clear picture of the state of cure and the profile of the cure gradient and cure state as existent between the different treatments being investigated. This cure gradient and cure state provide a tremendous tool in process control.

For example, the cure gradient obtained from the statistically designed wear tests will show the process controller the type of correction required in his specific cure to obtain an optimum cure gradient. Of equal importance is the ability to obtain accurate wear comparisons between samples pertaining to carbon black reinforcing properties, the effect of type and quantity of vulcanization accelerators and activators, the influence of type and composition of elastomers, process plasticizers, and the like by this novel means, whereas heretofore the experimental error involved in such tests were of such a magnitude as to completely mask, or render entirely worthless, the data obtained in wear tests.

In particular, the statistically designed wear tests coupled with the specific mechanical procedures employed for selecting the preparing screened tires with appropriate statistical designs interpreted through the recognition of the effect of the cure gradient and cure state enable one to determine the relative wear performance of any tread wearing composition of matter with respect to any other composition of matter referred to as a control under any level of wear severity and under any climatic condition at a cost and expenditure of time equal to one-half to one-twentieth that of other known testing procedures, and at an experimental error lower than heretofore possible.

Using the statistically designed wear tests also enables the experimenter to road test a tire a few hundred miles, mechanically remove an amount of tread wearing surface equivalent to several thousand miles of wear, again road test the tire for another few hundred miles, and thereby ascertain not only the cure gradient but also the total life expectancy of the different treatments in the tread of the tire. This accurate knowledge of the cure gradient, or ascertainment of the state of cure, will enable the manufacturer to adjust the cure of each tread treatment to the optimum state. The recognition of the cure gradient and cure state and its effect on wear rate will enable the tire tester to accurately report to the tire manufacturer the total life expectancy of the tread, while at the same time providing a new type of cure quality control. Small differences, such as obtained in the comparison of the reinforcing properties of a reinforcing pigment such as one carbon black compound to another, will be reflected as true changes since the novel method outlined herein achieve extremely low standard deviations of variation.

A statistically designed screening wear test may be conducted with any number of variables or treatments ranging from two to 100 (although most wear experiments are concerned with from four to 16 treatments) with any number of tires ranging from one to 100 (although most experiments will be built using from one to eight tires), and with from two to 10 different tread rubber compounds peripherally placed in segments around the tire, with each tread segment having a multitude of different points of wear measurements taken on its individual surface. The type of statistical design may vary from completely balanced block types to partially balanced incomplete block designs with two associate classes to partially balanced incomplete blocks with no associate classes. The mathematical solutions to these different types of statistical designs may be made in accordance with established mathematical procedures as exemplified in a publication of Bose, Clatworthy, and Shrikhande (Reprint No. 50, North Carolina Agriculture Experimental Station, August 1954) or by planar anaylsis as propounded by Patentee wherein all possible abrasion index relationships between all treatments are calculated using conventional mathematical ratios to find the relative wear of each tread treatment with respect to the relative wear of all other tread treatments. Applicant prefers to use statistical designs where lambda(s) are always positive for ease of mathematical solution, but designs where one lambda might be zero can also be used. The symbol, lambda, simply refers to the number of times any treatment is directly compared to any other treatment.

EXAMPLE OF ONE STATISTICALLY DESIGNED TIRE WEAR EXPERIMENT

One simplified example incorporating this novel concept of process control as relates to tire manufacturer comprises selecting a production line tire whose dynamic flexibilities are of a value less than 0.020 inches maximum radial runout on the interior for one 36° segment versus another 36+ segment; the exterior radial runout is not important since the tread will be removed through a lathe type operation in preparing the tire for its multitread wearing composition which contains the rubber compositions that are to be road tested. The thickness and width of the tread stock being supplied is controlled to 0.020 inches maximum variation so as to ensure a reasonably low radial and lateral force variation (25 pounds and 8 pounds respectively). The tire is cured using internal as well as external heat in as little as 14 minutes cure time for a 7.50-14 size tire where new tire type tread formations are being studied, using 250 p.s.i. internal pressure. All groove bottoms are deliberately made flat so as to improve the precision and accuracy of the tread depth measurements. The screening tires are then post inflated and tread depth measured for each groove at approximately 1 inch intervals for the entire tire circumference.

These tires are then run under carefully controlled conditions of speed, load, inflation, etc., over specially selected routes and rotated and measured at certain intervals to obtain the absolute rates of wear. The results of the tests are treated in a statistical design. For simplification, four tires having six-way treads and employing a partially balanced incomplete block design identified as the S7 design by Bose et al (referred to previously) is used to illustrate the mathematical solution of planar analysis. The S7 design studies eight variables or treatments in the experiment and has lambda values of three and two respectively for first and second associates. To more easily illustrate the simplicity of solution the abrasion wear indices are assigned arbitrary values as follows: Treatment 1=125 percent, 2=120 percent, 3=110 percent, 4=100 percent, 5=100 percent, 6=90 percent, 7=80 percent, 8=75 percent. The solution appears herewith for the four tires that are made up as follows:

(A) 152736 (B) 261548 (C) 374815 (D) 483627.

CALCULATION OF INDIVIDUAL SEGMENT ABRASION INDICES

|     |       |       |       |       |       |       |       |       | Avg. | Avg.[1] |
|-----|-------|-------|-------|-------|-------|-------|-------|-------|------|---------|
| #1  | 100.0 | 104.7-1 | 113.6-4 | 125.0-2 | 125.0-1 | 138.9-1 | 156.2-1 | 167.7-2 |      |         |
|     |       | 104.7-2 | 113.6-3 | 125.0-3 | 125.0-3 | 138.9-2 | 156.2-3 | 167.7-3 |      |         |
|     |       |         |         |         | 125.0-3 |         |         |         |      |         |
|     |       | 104.7 | 113.6 | 125.0 |       | 138.9 | 156.2 | 167.7 | 128.9 | 125.0 |
|     |       |       |       |       | 125.0 |       |       |       |      |         |
| #2  | 96.0-1 | 100.0 | 109.2-1 | 120.0-2 | 120.0-1 | 133.3-1 | 150.0-1 | 160.0-2 |      |         |
|     | 96.0-2 |       | 109.2-4 | 120.0-4 | 120.0-2 | 133.3-2 | 150.0-4 | 160.0-4 |      |         |
|     |       |       |         |         |         | 133.3-4 |         |         |      |         |
|     | 96.0  |       | 109.2 | 120.0 | 120.0 |       | 150.0 | 160.0 | 123.5 | 120.0 |
|     |       |       |       |       |       | 133.3 |       |         |      |         |
| #3  | 88.0-1 | 91.7-1 | 100.0 | 110.0-3 | 110.0-1 | 122.2-1 | 137.5-1 | 146.7-3 |      |         |
|     | 88.0-3 | 91.7-4 |       | 110.0-4 | 110.0-3 | 122.2-4 | 137.5-3 | 146.7-4 |      |         |
|     |       |       |       |         |         |         | 137.5-4 |         |      |         |
|     | 99/-  |       |       |         |         |         |         | 146.7 | 113.3 | 110.0 |
|     |       |       |       |         |         |         | 137.5 |         |      |         |

|     |         |         |         |         |         |         |         |         | Avg.  | Avg.[1] |
|-----|---------|---------|---------|---------|---------|---------|---------|---------|-------|---------|
| #4  | 80.0-2  | 83.3-2  | 90.9-3  | 100.0   | 100.0-2 | 111.1-2 | 125.0-3 | 133.3-2 |       |         |
|     | 80.0-3  | 83.3-4  | 90.9-4  | ——      | 100.0-3 | 111.1-4 | 125.0-4 | 133.3-3 |       |         |
|     |         |         |         |         |         |         |         | 133.3-4 |       |         |
|     | 80.0    | 83.3    | 90.9    |         | 100.0   | 111.1   | 125.0   | 133.3   | 103.0 | 100.0   |
| #5  | 80.0-1  | 83.3-1  | 90.9-1  | 100.0-2 | 100.0   | 111.1-1 | 125.0-1 | 133.3-2 |       |         |
|     | 80.0-2  | 83.3-2  | 90.9-3  | 100.0-3 |         | 111.1-2 | 125.0-3 | 133.3-3 |       |         |
|     | 80.0-3  |         |         |         |         |         |         |         |       |         |
|     |         | 83.3    | 90.9    | 100.0   |         | 111.1   | 125.0   | 133.3   | 103.0 | 100.0   |
|     | 80.0    |         |         |         |         |         |         |         |       |         |
| #6  | 72.0-1  | 75.0-1  | 81.8-1  | 90.0-2  | 90.0-1  | 100.0   | 112.5-1 | 120.0-2 |       |         |
|     | 72.0-2  | 75.0-2  | 81.8-4  | 90.0-4  | 90.0-2  |         | 112.5-4 | 120.0-4 |       |         |
|     |         | 75.0-4  |         |         |         |         |         |         |       |         |
|     | 72.0    | ——      | 81.8    | 90.0    | 90.0    |         | 112.5   | 120.0   | 92.7  | 90.0    |
|     |         | 75.0    |         |         |         |         |         |         |       |         |
| #7  | 64.0-1  | 67.9-1  | 72.7-1  | 80.0-3  | 80.0-1  | 88.9-1  | 100.0   | 106.7-3 |       |         |
|     | 64.0-3  | 67.7-4  | 72.7-3  | 80.0-4  | 80.0-3  | 88.9-4  | ——      | 106.7-4 |       |         |
|     |         |         | 72.7-4  |         |         |         |         |         |       |         |
|     | 64.0    | 67.7    | ——      | 80.0    | 80.0    | 88.9    |         | 106.7   | 82.5  | 80.0    |
|     |         |         | 72.7    |         |         |         |         |         |       |         |
| #8  | 60.0-2  | 62.5-2  | 68.2-3  | 75.0-2  | 75.0-2  | 83.3-2  | 93.7-3  | 100.0   |       |         |
|     | 60.0-3  | 62.5-4  | 68.2-4  | 75.0-3  | 75.0-3  | 83.3-4  | 93.7-4  | ——      |       |         |
|     |         |         |         | 75.0-4  |         |         |         |         | 77.2  | 75.0    |
|     | 60.0    | 62.5    | 68.2    | ——      | 75.0    | 83.3    | 93.7    |         |       |         |
|     |         |         |         | 75.0    |         |         |         |         | 103.0 | 100.0   |

The small suffix numbers after the individual abrasion index values indicate the tire number from which the calculation was made. It is obvious that in an actual experiment wherein various errors can enter, that the pairs of experiments (or triples) will not yield identical values. The average value of 103.0 in the lower right hand corner of the calculation represents the distortion of averaging reciprocal numbers and is inherent in any of the mathematical solutions employed if ordinary whole numbers are employed, but it may be eliminated completely if a logarithmic model is employed. In the specific illustrative case if logarithms of the numbers were employed, since the average abrasion index is arbitrarily established as 100.0 percent for the system under discussion, the average value of logarithms would have been 2.0000 where the figure 103 appears. The average abrasion wear values in the extreme right hand column that have been adjusted to the average wear performance base of 100.0 percent from the base of 103.0 percent would not be affected.

The full potential of materials of construction that are used in tire architecture can now be more completely exploited since new tire development results need no longer be shrouded by conflicting data. A judicious study of the spread in the paired and triple data of horizontal groups of data yield an indication of the reliability of precision of the average value depicted at the extreme right hand of the table.

As general illustrations of the breadth and scope of this invention, the following examples are cited.

EXAMPLE 1. The investigator wishes to determine the specific conditions of cure to employ for a specified tire so as to achieve the highest resistance to abrasion with the most desirable cure gradient. A sufficiently large number of tires to enable a satisfactory screening selection to be made are cured out using the standard conditions of time in mold, external mold temperature and internal applied heat and pressure. Since whole tires are involved an extremely rigid specification covering sample non-uniformity will be employed. Specifically only tires having less than 7 pounds radial and 2½ pounds lateral force variation, for example, will be selected for the controlled road wear test. Similarly, tires employing a difference in the cure conditions—i.e., a shorter time or higher or lower applied external or internal temperature would then be prepared and selectively screened to the same selection specification. The choice of the number of tires of each treatment to be road tested is regulated by the required confidence level for a minimum abrasion difference that will permit proper analysis. The tires of all treatments involved is then road tested under rigidly controlled conditions so as to ensure minimization or neutralization of the individual and collective factors effecting road wear, and measured at sufficient intervals and with sufficient accuracy so as to enable accurate and precise non skid loss versus mileage curves to be constructed for each of the treatments. Analysis of the cure gradient effect (and cure state) then determines the proper cure conditions to be employed to achieve the maximum abrasion resistance, or if the initial selection of treatment variables were initially improper, such conclusions would be dictated by the analysis of the cure gradient and cure state effects so that new cure conditions could be employed in another experiment. The road test is most conveniently conducted upon a fast wear course so as to enable the tires to be worn out in the minimum mileage although greater mileages to wear the tires out would not affect the conclusions.

EXAMPLE 2. It is desired to determine the influence of a construction change in a tire upon abrasion and overall performance. As in Example 1, since whole tread tires are involved, a rigid specification for tire selection is employed so as to permit a minimum number of tires to be road tested and still yield sufficiently accurate wear data to permit decisions to be made at a high confidence level if only small differences in wear should be encountered. If the experimental treatments affected the fundamental time temperature cure curves as a consequence of the tire being thicker or thinner or having a higher thermal conductivity the influence of this phenomenon could be readily determined from the cure gradient effect upon abrasion resistance. As in the previous example, complete and accurate non skid loss versus mileage curves for each treatment is determined. In another facet of this example it might be desired to compare tires made up in different plants using different construction and cure principles. Judicious tire screening coupled with rigid control of the road performance test will yield precise comparisons over the range of the tread life of the tires. Analysis of the wear performance data enables the investigator to separate the cure gradient effect from the structural effects upon abrasion wear.

EXAMPLE 3. In this example the investigator wishes to determine the optimum factory mixing and extrusion conditions to employ for a given tread stock formulation so as to attain the maximum abrasion resistance in the finished tire. The entire work project is performed in a factory where the green tire can be built and cured using the specific cure conditions that have been established. It may be desired to determine the precise effect of Banbury mixing time (e.g., 5 min. versus 4 min.), the optimum number of remills to employ, or the effect of repeated remilling upon the ultimate abrasion property. A suitable statistical design is selected and the tires built with multisection treads and then cured. After vulcanization the tires are checked for their dynamic flexiblity variations (radial runout, radial and lateral force runout) to ensure each integral tire of the experiment to have the desired degree of perfectness, after which the tires are road tested under carefully controlled conditions, perfectably under fast wear conditions. The non skid losses at selected mileages or percent of tread worn are then analyzed using conventional mathematical means or planar analysis as developed by applicant. Interpretation of the relative wear data for each of the treatments investigated regulate the conditions to employ for proper factory processing.

EXAMPLE 4. The investigator in this instance might be an independent chemical manufacturer or supplier who does not have complete tire factory facilities available to him. He desires to determine the proper amounts and preferable types of organic accelerators to employ for optimum resistance to abrasion. Regular production tires of the size desired are first screened for their relative degree of imperfection and are then detreaded and fitted with individual tread sections in accordance with a previously selected statistical design. The tires so built are then cured in a mold with special flat bottomed grooves to improve the precision of the depth measurement determination, using heat application both internally as well as externally so as to achieve essentially the same time temperature relationships at the tread surface and at the undertread as would characterize the factory operation he desires to duplicate. For improved dimensional stability the tires are post inflated after removal from the curing mold. In preparing the tread element sections prior to applying them to the detreaded tire, caution must be exercised to assure equivalent dimensions so as to ensure a final vulcanized tire with a minimum of structural defects. The tires are then tested under controlled conditions, preferably on a fast wear route with a multitude of tread depth measurements being taken at appropriate intervals to ensure great accuracy, then solving the statistical design using conventional methods of mathematics or by the method of planar analysis developed by Applicant. Analysis of the wear performances data will then determine the proper types and amounts of accelerator to employ in the tread formulation.

EXAMPLE 5. In this example the investigator desires to determine the relative wear performance of a new composition of tread matter with reference to a standard material with which he is familiar. He further desires to know how said performance might vary as a result of a change in terrain from severe mountain to flat plain, from northern cold climates to hot equatorial regions. Only a limited number of treatments are involved and these have been previously studied to finitely adjust curing rates so that all are equal. An appropriate statistical design is selected which will yield the desired degree of precision and accuracy. The tires may be built in a factory operation as in example 3 or using screened detreaded tires as described in example 4. Two sets of tires would be prepared. Since the number of treatments being investigated is small and since proper precautions are employed to select screened tires having only minimum imperfection, a high order of precision is possible with three or possibly only two tires in a set. Thus two sets of tires would comprise only four or at the most six tires. One of the sets would be over aged for one month at 80° C. in a protected non oxidizing atmosphere to simulate the influence of heat aging that would be undergone by a tire in use in a hot climate during its useful life. The unaged and aged tires may then be tested under rigidly controlled conditions of speed, load, etc., preferably over a fast wear route. The individual tread sections are then measured finitely in a multiplicity of places at appropriate intervals so as to ensure being able to characterize the wear throughout the entire depth of the tread compound. For any assigned wear severity, i.e.—30 miles per mil or 100 miles per mil and any assigned length duration test, i.e.—10,000 miles or 30,000 miles, the absolute wear of the control cmopound is determined fron the non skid loss versus mileage curve along with the loss of the experimental treatment at the same mileage. For any specific comparison—i.e., high severity 10,000 mile or low severity 30,000 mile the relative performance of the experimental treatment in comparison to the control reference material may be readily determined. Similarly, the influence of the heat aging during use upon either materials both as to absolute and relative effects can accordingly be determined so as to enable the investigator to postulate how the experimental material could be expected to perform relative to the reference material under any of the specified conditions as outlined at the beginning of the present example.

EXAMPLE 6. A tire design engineer desires to evaluate the effect of changing a tread design which is contemplated for a general type of truck tire. For exmaple, only, it may be desired to investigate the influence of interlocking of the tread design elements versus non-interlocking of these same tread elements upon the wear property, and to compare basically different tread designs such as, for example, a three-rib two groove design, versus a sever-rib six groove design, or a three-rib two groove design where the two shoulder ribs might have transverse grooves which permit water expulsion on wet roads. Heretofore the cost of conducting comprehensive performance tests on each contemplated design would be prohibitive, and the general reproducibility of wear results would be extremely poor between tires having identical tread designs; therefore, the design engineer ordinarily would arbitrarily eliminate some design (s) from consideration because of the over-riding cost factors, however; by using the principle of multitread sectional tires as set forth herein, the cost and accuracy objections just cited can be overcome. Actual mold tread designs are fabricated as an arc or segment of the tire. Where the engineer has six designs that he wishes to evaluate, the mold segments are fabricated into segments which comrise 60° of the arc of the tire tread. The six different metal matrix tread designs which make up the mold are joined together by suitable means into one single continuous mold which extends 360°. The tire mold engineer now can manufacture and vulcanize tires each having six distinct tread designs vulcanized onto each single tire that has been manufactured for test. This expedient enables one to study the performance of each tread design as a function of the designs being road tested on engine driven tractor wheels and on free rolling trailer wheels. Accordingly, the test sample is subdivided into two subparts—A and B—with subpart A being run first on tractor wheels while subpart B is simultaneously run on free rolling trailer wheels; and then the tires are switched at an arbitrarily predetermined mileage so that subsample A is now being run on trailer wheels while subsample B is running on tractor wheels.

A total of 16 tires are road evaluated. The reason for the larger number of tires being preferred in the test sample is that the wear variation of 60° tread arcs of whole truck tires with unit treads being treated as though they were different treads yield a standard deviation of wear variation of 10.5 percent between any two 60° tread arcs. Since each arc segment appears 16 times in the 16 tires, and since each arc segment is compared to five other arc segments in each tire, any individual tread pattern design is thus characterized a total of 80 times by direct comparison (16 × 5). Thus the standard deviation of wear variation for any mold design compared to any other mold design in one tire is 10.5 percent but since "$n$", the number of characterizations, is 80 for this particular experiment, the standard deviation of wear variation of any mold design is 1.18 percent ($10.5/\sqrt{80}$). The differences of wear indices of 4.6 percent are significant at the 95 percent confidence interval while differences of 6.0 percent are significant at the 99 percent confidence interval. The terms "confidence interval" and "standard deviation" are defined in any good textbook on statistics.

The wear results obtained from the above study are given in the following tables:

TREAD MILS LOSS (.001") OF DIFFERENT TREAD ARCS--1st CYCLE

| NO. | MILES | \multicolumn{6}{c}{TREAD PATTERN IDENTIFICATION NO.} | |
|---|---|---|---|---|---|---|---|---|
| | | 1 | 2 | 3 | 4 | 5 | 6 | AVG |
| \multicolumn{9}{c}{ENGINE DRIVEN TRACTOR WHEELS} |
| 1A | 24878 | 108.2 | 95.9 | 82.7 | 89.0 | 89.7 | 115.3 | 96.8 |
| 2A | " | 106.0 | 111.5 | 93.8 | 99.9 | 95.3 | 120.0 | 104.4 |
| 3A | " | 96.3 | 94.5 | 93.2 | 88.9 | 100.7 | 112.3 | 97.7 |
| 4A | " | 132.3 | 140.1 | 142.0 | 120.5 | 136.8 | 173.8 | 140.9 |
| 5A | " | 117.9 | 78.0 | 71.6 | 101.2 | 114.7 | 120.0 | 100.6 |
| 6A | " | 105.4 | 101.2 | 97.7 | 103.2 | 109.0 | 105.1 | 103.6 |
| 7A | " | 152.6 | 112.8 | 129.4 | 132.6 | 147.7 | 144.0 | 136.5 |
| 8A | " | 110.2 | 127.1 | 108.0 | 112.5 | 116.5 | 158.8 | 122.2 |
| | | 116.1 | 107.6 | 102.3 | 106.0 | 113.8 | 131.2 | 112.8 |
| WEAR INDEX (1) | | 97.0 | 104.6 | 110.0 | 106.3 | 99.0 | 185.8 | 100.0 |
| \multicolumn{9}{c}{FREE ROLLING TRAILER WHEELS} |
| 9B | 24878 | 130.4 | 83.6 | 69.7 | 91.0 | 126.1 | 92.8 | 98.9 |
| 10B | " | 88.1 | 80.3 | 86.8 | 92.1 | 126.8 | 106.7 | 96.8 |
| 11B | " | 86.8 | 72.3 | 61.7 | 74.8 | 91.9 | 80.7 | 77.8 |
| 12B | " | 101.6 | 88.6 | 53.4 | 89.1 | 107.7 | 99.1 | 89.9 |
| 13B | " | 120.3 | 94.3 | 87.9 | 88.5 | 108.5 | 114.2 | 102.3 |
| 14B | " | 86.7 | 85.1 | 86.8 | 92.7 | 104.9 | 108.4 | 94.1 |
| 15B | " | 75.5 | 62.2 | 56.0 | 61.9 | 81.5 | 70.6 | 67.9 |
| 16B | 24878 | 80.5 | 77.8 | 57.3 | 70.0 | 80.6 | 75.9 | 73.7 |
| | | 96.2 | 80.5 | 69.9 | 82.5 | 103.5 | 93.5 | 87.7 |
| WEAR INDEX (1) | | 91.2 | 109.0 | 125.4 | 106.3 | 85.7 | 93.9 | 100.0 |

(1) The higher the index the greater the improvement in wear.

| COMPOSITE WEAR INDEX | 94.1 | 106.8 | 117.7 | 106.3 | 92.4 | 89.9 |
|---|---|---|---|---|---|---|

TREAD MILS LOSS (.001") OF DIFFERENT TREAD ARCS--2nd CYCLE

| TIRE NO. | MILES | \multicolumn{6}{c}{TREAD PATTERN IDENTIFICATION NO.} | |
|---|---|---|---|---|---|---|---|---|
| | | 1 | 2 | 3 | 4 | 5 | 6 | AVG |
| \multicolumn{9}{c}{ENGINE DRIVEN TRACTOR WHEELS} |
| 1A | 23672 | 27.0 | 36.7 | 30.3 | 31.5 | 40.3 | 34.2 | 33.4 |
| 2A | " | 47.2 | 33.0 | 39.2 | 45.0 | 50.9 | 50.2 | 44.3 |
| 3A | " | 41.1 | 27.9 | 34.8 | 35.0 | 36.3 | 41.0 | 36.0 |
| 4A | " | 34.2 | 35.3 | 29.8 | 39.5 | 42.4 | 40.5 | 36.9 |
| 5A | " | 26.5 | 24.4 | 27.1 | 25.6 | 19.3 | 29.9 | 25.5 |
| 7A | " | 49.4 | 43.9 | 46.4 | 37.1 | 41.1 | 51.9 | 45.0 |
| | | 37.6 | 33.5 | 34.6 | 35.6 | 38.5 | 41.3 | 36.8+ |
| WEAR INDEX | | 98.0 | 110.0 | 106.7 | 103.5 | 95.9 | 89.4 | 100.0 |

FREE ROLLING TRAILER WHEELS

| | | | | | | | | |
|---|---|---|---|---|---|---|---|---|
| 9B | 23672 | 96.3 | 63.6 | 73.3 | 73.2 | 96.3 | 82.0 | 80.8 |
| 11B | " | 100.3 | 99.4 | 80.7 | 98.7 | 106.9 | 125.2 | 101.9 |
| 13B | " | 87.9 | 68.9 | 71.2 | 70.1 | 79.3 | 78.8 | 76.0 |
| 14B | " | 157.0 | 158.8 | 130.7 | 151.0 | 159.4 | 171.7 | 151.4 |
| 15B | " | 96.9 | 56.8 | 53.0 | 66.2 | 85.3 | 88.2 | 74.4 |
| 16B | " | 87.3 | 87.8 | 62.2 | 78.1 | 95.8 | 98.6 | 85.0 |
| | | 104.3 | 89.2 | 78.5 | 89.5 | 100.5 | 107.4 | 94.9 |
| WEAR INDEX | | 90.9 | 106.1 | 120.9 | 105.9 | 94.2 | 88.2 | 100.0 |
| COMPOSITE WEAR INDEX | | 94.5 | 108.1 | 113.8 | 104.7 | 95.1 | 88.8 | |

The composite wear indices for the six tread patterns is thus 94.3, 107.5, 115.8, 105.5, 95.8 and 89.4. Statistically, designs 1 and 5 appear to be no different from each other but significantly an improvement over Design 6. Designs 2 and 4 do not appear to be significantly different from each other, but they represent a significant improvement over Designs 1 and 5. The criteria employed in the analysis are the 4.6% and 6.0% differences cited previously.

I claim:
1. A method of evaluating tread wearing compositions for a vehicle tire tread comprising:
   1. arranging a plurality of individual segments of tread wearing compounds about the outer periphery of a tire in a manner to form a continuous tread wearing compound, and wherein one segment differs in composition with respect to an adjacent segment;
   2. selecting a statistical design which yields a predetermined level of precision and accuracy for characterizing the wear performance of the tread wearing compositions to be tested;
   3. fabricating said vehicle tire in accordance with said statistical design wherein each different individual tread segment represents a different treatment and wherein the individual segments, when placed adjacent each other, form a continuous tread of a multitread tire;
   4. carrying out a wear performance test on the tire to thereby determine the relative performance of each tread compound with respect to the relative performance of the remaining tread compounds.
2. The method of claim 1 wherein planar analysis is used in solving the statistical design of step (2) in order to provide the relative performance of step (4).
3. The method of claim 1 wherein the tire of step (3) is a selected screened tire.
4. The method of claim 1 wherein each segment is fabricated to provide a tread design which differs from an adjacent tread design.
5. A method of evaluating tread wearing compositions for a vehicle tire tread comprising:
   1. arranging a multiplicity of individual segments of various tread wearing compounds about the periphery of a tire to form a tread;
   2. selecting a statistical design which yields a predetermined level of precision and accuracy for characterizing the wear performance of the tread wearing compositions to be tested;
   3. fabricating said vehicle tire in accordance with said statistical design wherein each individual segment represents a different treatment and wherein the individual segments are placed adjacent each other to form a continuous tread of a multi-tread tire;
   4. carrying out a wear performance test on the tire to thereby determine the relative wear rate of each tread compound with respect to the relative wear rates of the remaining tread compounds.
6. The method of claim 5 wherein more than four segments are used in fabricating said vehicle tire.
7. The method of claim 5 wherein the length of each segment is contained within the footprint of the tire.
8. The method of claim 5 wherein the various tread compounds include the reinforcing pigment used therein.
9. The method of claim 5 wherein the various tread wearing compounds include the elastomer used therein.
10. The method of claim 5 wherein the term "different treatment" includes vulcanizing a tread design on the tread wearing compound which differs from the tread design on an adjacent segment.
11. A method of evaluating tread wearing compositions for a pneumatic tire tread comprising:
    1. arranging a plurality of individual segments of tread wearing compounds about the outer periphery of a tire in a manner to form a continuous supporting surface, wherein the composition of one segment differs with respect to an adjacent segment;
    2. using the tire to determine the relative performance of the different tread segments with respect to one another.
12. The method of claim 11 wherein the different tread segments have a different tread design molded thereon.
13. The method of claim 12 wherein more than four different segments are included in the tire.
14. The method of claim 13 wherein the tread wearing compositions are arranged according to the following steps:
    a. selecting a statistical design which yields a predetermined level of precision and accuracy for characterizing the wear performance of the tread wearing compositions to be tested;
    b. fabricating said vehicle tire in accordance with said statistical design wherein each different individual tread segment represents a different treatment and wherein the individual segments, when placed adjacent each other, form a continuous tread of a multitread tire.

* * * * *